Patented Jan. 13, 1953

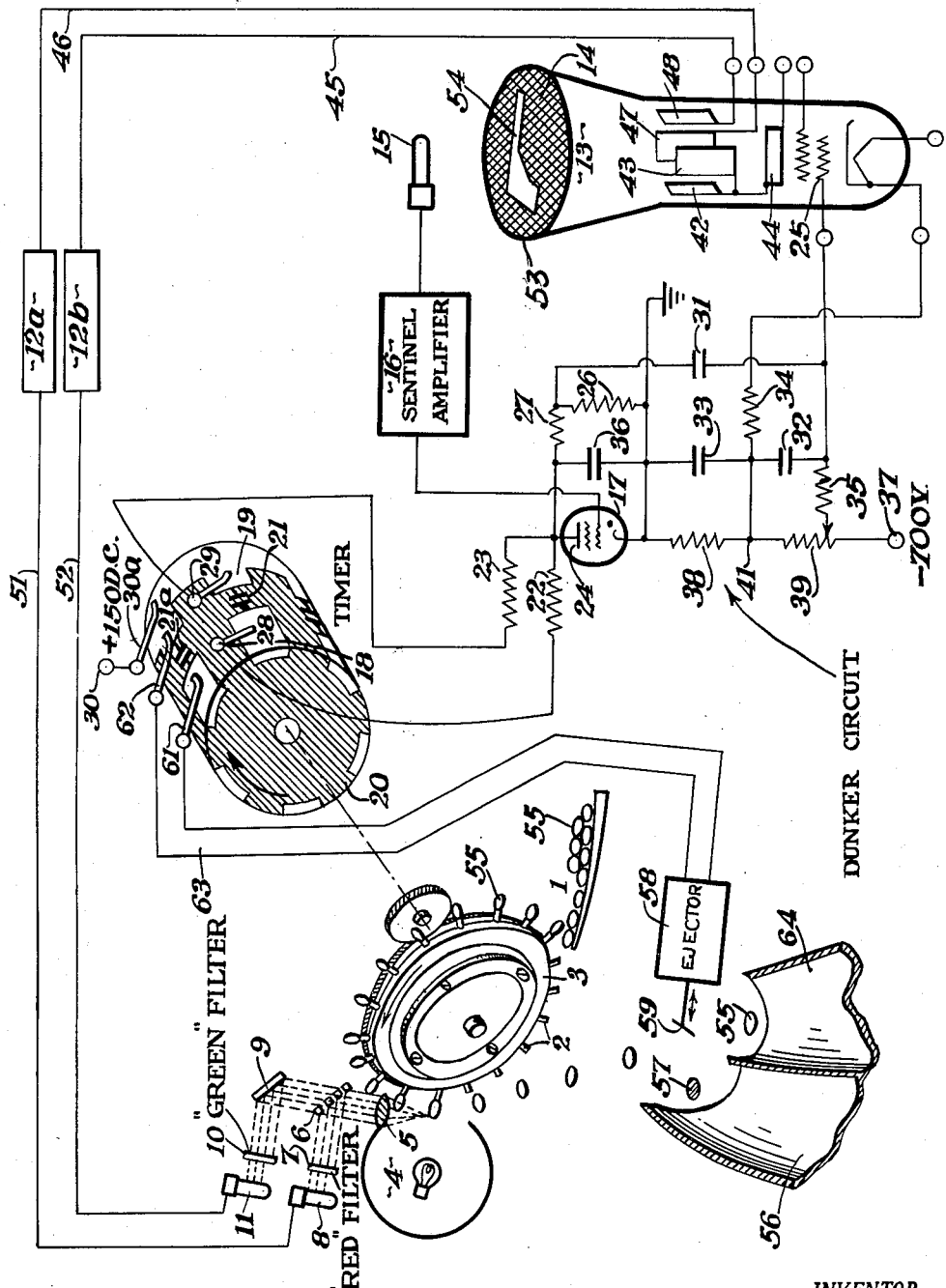

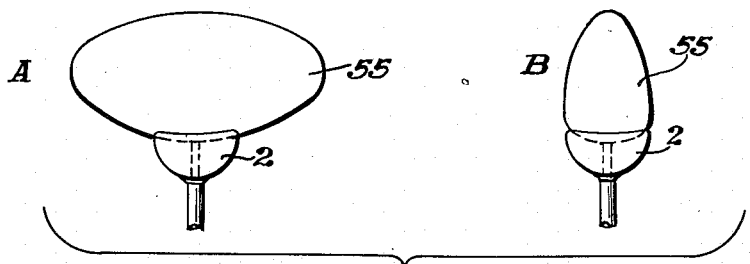
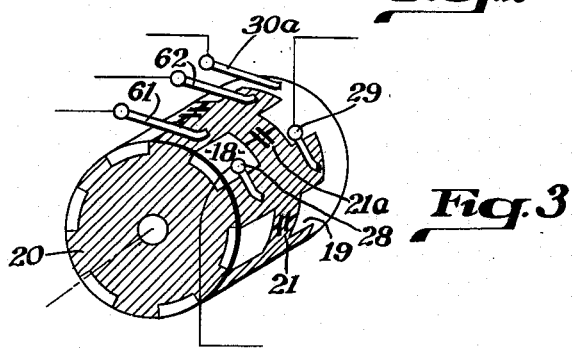
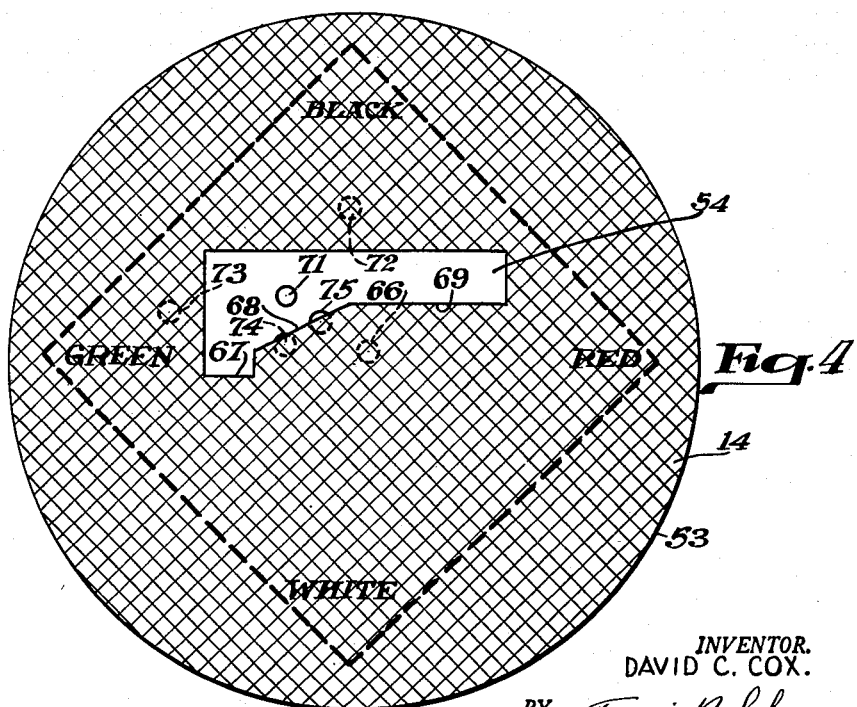
INVENTOR.
DAVID C. COX.

2,625,265

UNITED STATES PATENT OFFICE 2,625,265

PHOTOELECTRIC SORTING APPARATUS

David C. Cox, Grand Rapids, Mich., assignor to Electric Sorting Machine Company, Grand Rapids, Mich., a corporation of Michigan Application April 1, 1947, Serial No. 738,714

26 Claims. (Cl. 209—111)

My invention relates to optical sorting and has for its principal object the prolongation of the life of cathode ray tubes employed in photoelectric sorting as well as increasing the reliability of response of control apparatus to such cathode ray tubes.

A general object of my invention is improvement in bichromatic photoelectric scanning and article sorting.

In my prior patents, such as Patent No. 2,244,826 for example, I have described bichromatic sorting machines capable of distinguishing colors as such. Such machines employ a conveyor system for receiving the articles which are to be passed and have a cull chute for receiving rejected articles which are off-color. A carrier is provided for presenting the articles in succession for scanning in a viewing chamber. Two different color filters and a pair of photoelectric tubes are employed for measuring the brightness of light of two different colors reflected from the object in the viewing chamber. Direct current amplifiers are employed for obtaining the requisite amplification of signals from the photoelectric tubes. A cathode ray tube having a transverse sweep circuit is employed for producing an indication, by the position of the cathode ray spot on the cathode ray screen, in terms of a bichromatic color graph. Thus the brightness of one color deflects the spot of the cathode ray tube vertically and the brightness of the other color deflects it horizontally. The cathode ray screen is partially covered or masked so that the cathode ray spot is visible for only a predetermined range of color values. Although the apparatus may be arranged either to pass or reject specimens when the cathode ray spot is exposed, for the sake of illustration the arrangement will be described as rejecting culls when the cathode ray spot is exposed. A "sentinel" phototube is provided for detecting the presence of the exposed cathode ray spot. As long as the spot is under cover the articles are passed. Whenever the spot moves into the open area, the sentinel phototube picks up the signal, actuates a tripping device and causes the cull to be ejected. To obtain sufficient energy for operating the tripping device, such as the thyratron, a sensitive amplifier is required between the thyratron and the sentinel phototube.

The sentinel amplifier must not only be sensitive but also must be reliable and produce suitable output signals regardless of the type of article being examined or the manner in which the article is presented to the optical viewing fields. For example, when long beans are being sorted, there is a possibility of the bean entering the field of view either lengthwise or crosswise, so that as the bean passes through the field of view, it may be within the field for a short period of time or a long period of time for a constant speed of movement of the article carrier. Thus a long black bean entering the field of view would displace the spot on the cathode ray tube into the black corner of its screen very early in the viewing cycle. The spot would then be held in a black corner of the cathode ray screen until after the normal scanning time as a result of the unusual length of the bean. On the other hand, another bean appearing on the edge would fill the field of view for a very short instant. This instant might appear early or late in the scanning cycle. Furthermore, some beans have such a color as to cause the spot to come out from under the edge of the mask over the cathode ray screen with a motion almost tangent to the pattern edge, so that the spot moves slowly. Under such a condition the sentinel amplifier would be required to respond reliably to a signal increasing slowly in intensity.

It is apparent, therefore, that the sentinel amplifier must operate the trip mechanism with great reliability on different types of signals varying in their time interval of occurrence, time duration, and in steepness of wave front. Furthermore, the amplifier must not be displaced or disturbed by previous signals which may also have varied in characteristics and also have varied in the time interval preceding the immediate signal.

The life of cathode ray tubes, especially the screens thereof, is greatly affected by the intensity of the cathode ray beam allowed to impinge upon the screen and also by the length of time the spot is allowed to remain on the screen. It is desirable, therefore, to employ a method of sorting which requires a cathode ray beam to exist for a minimum period of time and with a minimum intensity.

It is, accordingly, an object of the invention to sort articles accurately and reliably, whether such articles are of regular or irregular shape and whether or not they are presented in one position or another to the viewing apparatus. Furthermore, it is an object to avoid difficulties in the design of sensitive amplifiers for use in photoelectric sorting. In addition, it is an object to prolong cathode ray tube life.

Specifically, it is an object to obtain response to a cathode ray tube with a minimum time duration of the spot. A further object is to obtain uniformity of time duration of the exposed spot. Likewise, it is an object to obtain uniformity of a signal produced by a cathode ray spot in a sentinel amplifier. Also it is an object to obtain reliability of response of a sentinel system to cathode ray tube screens and to compensate for differences of sensitivity of cathode ray screens in different tubes, in order to render cathode ray tubes interchangeable in photoelectric sorting apparatus without the necessity for readjustment or attendance by skilled electricians or electronic service personnel.

Another object is to sort articles such as beans, for example, and to obtain color response and brightness response which is independent of the length of the bean and of the angle at which it is presented to view. Furthermore, it is an object to sort articles reliably and accurately independently of the possibility of a succession of articles deviating from other articles sorted, such as a succession of black beans for example, where most of the beans sorted are light in color.

Still another object is to obtain a substantially uniform response to a slowly or quickly emerging cathode ray tube spot.

Still another object of the invention is to obtain reliable response to cathode ray tube spots independent of the speed or slowness of the response of the individual cathode ray tube to variations in its control grid potential. Likewise, it is an object to compensate for variations in the control grid voltage required to produce a beam in different cathode ray tubes, or in the same tube, under different conditions of operation or ageing.

Still another object of the invention is to assure maintenance of a control signal until a record thereof has been obtained for operation of a tripping device.

Still another object of the invention is generally to convert signals of varying wave-front steepness, duration and intensity into signals of uniform wave shape, duration and strength.

Still another object of the invention is to produce light impulses of uniform strength.

Other and further objects, features and advantages of the invention will become apparent as the description proceeds.

In carrying out my invention in a preferred form thereof for sorting relatively homogeneous devices such as beans or other small articles, I employ a rotary bowl feeder in conjunction with a rotating vacuum drum for picking up the beans or other articles to be sorted and carrying them into a viewing chamber. I provide a mechanism for picking up the articles and exposing them to the view of a bichromatic phototube system and a color responsive control system for ejecting the articles from the supporting drum or allowing them to pass, according to whether or not the color response falls within a predetermined color range.

The control system includes a cathode ray tube, a sentinel system, a tripping device and an ejector-operating delay or recording system. The cathode ray tube is arranged to have its beam deflect to represent the color of the viewed object in rectilinear co-ordinates representing two different colors. The sentinel system is arranged for viewing the cathode ray screen and operating the ejecting means through the tripping device whenever the color response falls within a predetermined color range represented by an opening in a mask placed over the screen of the cathode ray tube. In order that the ejector may be operated after the viewed article has been carried by the supporting drum out of the viewing chamber to the position of alternative chutes for receiving the culls or passable articles, an electrostatic recording and delay system is provided consisting of a rotating timer carrying condensers which are charged whenever the sentinel system indicates a cull. The charge of the condensers is utilized for operating the ejecting mechanism after the condenser drum and the article supporting drum have reached the appropriate angular position.

The tripping device is of a suitable type, such as a thyratron for example, which is rendered conductive in response to energization of the sentinel system in order to charge the appropriate condenser of the timer. A connection is provided for energizing the cathode ray tube each time an article is brought into the viewing chamber for scanning. The thyratron trip device is provided also with a circuit for immediately deenergizing the cathode ray tube in response to appearance of the cathode ray spot upon an exposed part of the screen of the cathode ray tube in order to increase the length of the tube life by operating the mechanism with a minimum duration of exposure to the cathode ray beam of the used portion of the cathode ray screen. The arrangement serves also to provide an electrical signal of uniform duration for the sentinel system, in order to increase the accuracy and reliability of the sentinel system independently of size or shape or angle of presentation of the viewed articles.

A better understanding of the invention will be afforded by the following detailed description considered in conjunction with the accompanying drawing, in which Fig. 1 is a schematic diagram of sorting apparatus for carrying out my invention in accordance with one embodiment thereof, including an electric circuit diagram of a thyratron control circuit;

Fig. 2 is a detailed view of objects to be scanned in different positions as held by suction supporting devices;

Fig. 3 is a fragmentary diagram representing the condenser timer drum of Fig. 1 in a position it occupies during an interval between scanning of successive articles; and Fig. 4 is a diagram of the screen of the cathode ray tube representing positions of the cathode ray spot for different color responses and showing a pattern for obtaining operation in response to a predetermined range of color values.

Like reference characters are utilized throughout the drawing to designate like parts.

In the form of apparatus represented by way of illustration, there is a mechanism for successively picking up articles to be sorted and presenting them to the bichromatic photoelectric viewing system in a viewing chamber. There is also a color response control system for either ejecting the articles or passing them according to whether or not the color response falls within a predetermined range. Furthermore, there is a mechanism for "storing the record" of the condition of the article until after it has been carried from the viewing chamber to a suitable position at which it may be ejected into a cull chute or allowed to drop to a conveyor belt. The general form of arrangement for picking up the article and carrying it into a viewing chamber where it is subjected to a bichromatic viewing system has been described in my prior patents. The general arrangement of the mechanism for storing the indication and for passing or ejecting the article has also been described by me in my prior patents. The control system, especially the arrangement for controlling the cathode ray tube and for preventing the emergence of the light spot except during the length of time actually required to produce a control operation is, however, novel and constitutes an improvement of arrangements heretofore described by me.

The arrangement for picking up the article and enabling it to be viewed includes a rotary bowl feeder 1, a plurality of suction nipples 2 carried on a vacuum drum 3, a lamp housing 4 through which the drum 3 is adapted to carry the articles to be viewed, and an optical system. The latter includes a viewing lense 5 with a striped mirror 6 for reflecting beams of light through a color filter 7 to a photoelectric tube 8, and also a continuous mirror 9 for reflecting the remaining beams of light through a second color filter 10 to a phototube 11. The color filters 7 and 10 are of different colors, for example red and green, respectively, although the invention is not limited thereto.

The rotary bowl feeder is of the type shown in my Patent #2,325,665 represented by reference numerals 52 and 55 of that patent. The vacuum drum 3 and the suction nipples 2 may also be of the type shown in my aforesaid patent, as represented by reference numerals 4 and 10 respectively, or may be of the type described in my Patent #2,244,826. The viewing chamber 4 and photoelectric lens system, including the photoelectric tubes 8 and 11, may also be of the type described and illustrated in greater detail in my foregoing patents and these parts, therefore, need not be described in detail herein.

The color response control system includes a cathode ray tube 13 having sweep circuits responsive to the photoelectric tubes 8 and 11 through direct current prototube amplifiers 12a and 12b respectively. The cathode ray tube 13 has a mask or pattern 14 over its screen. The control system includes also a sentinel photoelectric tube 15 adapted to view the exposed portion of the screen of the cathode ray tube 13 so as to respond to emergence of a light spot from under the mask 14, a sentinel amplifier 16, a trip device 17 responsive to the amplifier 16, and a rotary timer or recording delay device 20 including rotating condensers 21 adapted to be charged by the trip device 17 whenever the sentinel amplifier 16 is energized.

The trip device 17 or relay is preferably a fast acting voltage responsive device such as a grid control electric discharge device of the type which remains conducting after its grid has been energized, independently of subsequent variations in the grid voltage so long as plate or anode potential is applied thereto. It may be a device of the type known as a thyratron, and for convenience the term "thyratron" will be employed hereinafter in the specification and claims to designate such a trip device, although the invention is not limited to the particular type of relay or discharge device sold under the name of thyratron.

The timer drum 20 includes a plurality of "cold" lugs or contacts 18 and a continuous metallic slip ring having a plurality of "hot" lugs 19. The parts 18 and 19 are composed of suitable conducting material, such as copper for example, set in an insulating cylinder and the condensers 21 are also supported in the insulating cylinder, the condensers each being connected between one of the cold lugs 18 and one of the hot lugs 19. The drum 20 is rotatively connected by gearing or chains to the vacuum drum 3 so as to run synchronously therewith at a multiple of the speed thereof, the arrangement being analogous to that shown in my prior Patent #2,244,826. The speed of the drum 20 is geared up with respect to the speed of the drum 3 in such a manner that electrical contact is made with the lugs 18 and 19 as often as a support 2 for an object to be viewed is brought into viewing position by the vacuum drum 3 in the viewing chamber or lamp housing 4.

The thyratron 17 has a pair of plate or anode resistors 22 and 23, the latter preferably having greater resistance, both being connected to the anode or plate 24 of the thyratron 17. The cathode ray tube 13 is provided with a control grid 25.

A pair of plate bleed resistors 26 and 27 are connected in a series across the thyratron 17, the cathode of which is grounded, and the resistance of the series combination 26 and 27 is relatively great in comparison with the resistance of the plate resistor 23.

The timer lugs or contacts 18 and 19 are adapted to be connected to the plate resistors 22 and 23 by brushes 28 and 29, respectively, and a brush 30a is provided for making continuous electrical contact between the hot lugs 19 and the positive terminal 30 of a suitable power supply, such as a 150-volt direct current source.

For coupling the cathode ray tube control grid 25 to the plate 24 of the thyratron 17, a capacitative voltage divider is provided, comprising condensers 31, 32 and 33 connected as shown.

Preferably the cathode ray tube 13 is provided with a cathode resistor 34 connected to the junction terminal of the voltage divider condensers 32 and 33 and, preferably, the cathode ray tube grid 25 is provided with a grid leak resistor 35. If desired, a condenser 36 of relatively small capacity may be connected across the thyratron 17. A source of relatively high-voltage negative bias having a negative terminal 37 is provided and there is a resistance voltage divider consisting of resistors 38 and 39 connected in series between the bias voltage terminal 37 and the grounded cathode terminal of the thyratron 17. The junction terminal 41 of the voltage divider resistors 38 and 39 is also the junction terminal of the voltage divider condensers 32 and 33 to which the cathode ray tube cathode resistor 34 is connected. Although my invention is not limited to specific values, I have found that satisfactory results are obtained where the negative bias supply 37 has a voltage of minus 700 volts used with a 150-volt power supply 30 for a thyratron of the 2050 type.

The cathode ray tube 13 is provided with conventional deflection means shown as electrostatic; however, it will be understood that my invention is not limited thereto and does not exclude the use of cathode ray tubes with electromagnetic deflection means, having sweep coils instead of deflector plates. The tube 13 is provided with suitable conventional focusing electrodes and other electrodes with potential connections, not shown. One of the sweep plates of each pair, e. g., the sweep plates 42 and 43 are shown as electrically connected to one of the auxiliary electrodes 44. The phototube amplifiers 12a and 12b are provided with output conductors 45 and 46 coupled to the remaining sweep plates 47 and 48 respectively of the cathode ray tube 13. The phototube amplifiers 12a and 12b are also provided with input connections from the phototubes 8 and 11 respectively, shown schematically for the sake of simplicity, as the single lines 51 and 52.

The cathode ray tube 13 includes a conventional fluorescent screen 53 covered by a pattern so that only a portion of the screen 53 is exposed. According to whether the apparatus is intended to trip when the light characteristics of the viewed article fall within or without the predetermined range of color ratios and intensities, the pattern 14 is arranged to expose the central portion of the screen or to mask the central portion of the screen. In the arrangement illustrated, the exposed portion of the screen is surrounded by masked portions of the screen and the pattern 14 consists of a mask having an opening 54 therein exposing a predetermined area of the screen. The outline shape of the opening 54 is so chosen as to expose all portions of the screen, the rectilinear co-ordinates of which represent the ratios at which it is desired to trip the thyratron 17.

For causing the sorted articles, such as beans 55, to be ejected into the cull chute 56 in case of a sub-standard or defective or off-color specimen 57, an ejector 58 is provided. The ejector 58 may be of the solenoid type, such as illustrated at 118 in Fig. 2 of my Patent #2,244,826 or at 12 in Fig. 3 of my Patent #2,325,665. Since the ejector 58 per se is not part of my present invention, it need not be described in detail. Such an ejector includes a fast-acting solenoid, not shown, operating a plunger having an ejector tip or hammer 59 for knocking the defective bean 57 from one of the suction nipples 2 in response to discharge of condenser current when a charged capacitor 21 comes into the position in which the lugs 18 and 19 connected to it come under the brushes 61 and 62 connected through conductors 63 to the solenoid of the ejector 58. The timer 20 may be arranged to operate the ejector 58 in a manner similar to the arrangement described in my Patent #2,264,621.

During operation of the apparatus the centrifugal force acting upon the beans 55 in the rotary bowl feeder 1 moves the beans toward the outer edge of the feeder bowl 1 in such a position that when the vacuum drum 3 revolves, it brings the suction nipples 2 successively adjacent a bean at the outer edge of the feeder 1 and causes the bean to be picked up. Consequently, as shown in Fig. 1, the vacuum drum 3 revolving counter-clockwise, each of the suction nipples 2 beyond the edge of the feeder 1 carries a bean 55. The beans so supported are carried into the viewing chamber or lamp housing 5 by the rotation of the vacuum drum 3 as described more in detail in my Patent #2,325,665. Assuming that the mechanism is operated to pass all the beans having a color characteristic falling outside the color range represented by the area of the opening 55 in the mask 53, upon leaving the color chamber the vacuum is cut off and the passed bean 55 falls into the pass chute 64 upon a conveyor belt, not shown. The mechanism for admitting air cutting off suction to the nipples 2 at the appropriate angular position is not a part of my present invention and is described in my aforesaid Patent #2,325,665. To avoid confusing the drawing, the ejector 58 has been shown in a position separated from the vacuum drum 3. However, in the actual apparatus, as illustrated in my aforesaid issued patents, the ejector 58 is so mounted in a position following the location of the viewing chamber 5 that it may, when actuated, knock the bean off the suction nipple 2 into the cull chute 56 before it can drop into the pass chute 64.

As each bean passes through the viewing chamber 4 it is illuminated and successive portions thereof are viewed by the phototubes 8 and 11 through the optical system including the mirrors 6 and 9 and the lense 5. Owing to the presence of the color filters 7 and 10, the phototube 8 is responsive to reflected brightness or reflected components of one color of light, viz, "red" and the other phototube is responsive to the brightness of the reflected components of another color of light, viz, "green." For example, the cathode ray beam of the tube 13 having been turned on as the bean entered the viewing chamber by the timer 20, as will be explained hereinafter, the beam is deflected by the deflection plates 43 and 47 in one direction, according to the brightness of the reflected "red" light and is deflected in the direction perpendicular thereto by the deflection plates 43 and 47, according to the brightness of the reflected "green" light. As shown in Fig. 4, the surface of the cathode ray screen 53 represents a bichromatic graph and the position thereon of a light spot 66, that is, the point of impingement of the cathode ray beam on the screen 53 represents the relative proportions of "red" and "green" light reflected and also the intensities thereof. It has been found by experiment that beans to be selected for seed purposes, for example, will germinate if the color values thereof fall below or to the right of the boundary lines 67, 68 and 69 in the pattern 14; but, that the beans will not germinate if the color values fall within the area represented by the opening 54 in the mask 14. Accordingly, whenever the color value of the bean is such that the cathode ray beam is deflected to a point within the opening 54, for example, to the position 71, the sentinel photoelectric tube 15 is sufficiently illuminated to energize the amplifier 16 and to trip the apparatus energizing the ejector 58. However, if the color value is such as represented by positions 66, 72 or 73, the bean is satisfactory, the cathode ray beam is not observed by the sentinel phototube 15 and the thyratron 17 does not trip allowing the bean to fall into the pass chute 64.

Since only a portion of the screen is exposed by the opening 54, when the mask 14 is employed, the time duration of light spots, such as the spots 66, 72 and 73 covered by the mask 14 or the intensities of such spots, is of minor concern. However, the duration and intensity of light spots within the exposed area 54 is a matter of vital concern since the life of the cathode ray tube screen 53 is shortened by excessive intensity of the cathode ray beam or by prolonged exposure.

As the viewed articles travel through the viewing chamber 4, the reflected light intensity and the color proportions continuously change so that the cathode ray beam would tend to travel hither and yon along the surface of the screen 53. The arrangement is preferably such that the apparatus is tripped and the cathode ray beam is extinguished as soon as the cathode ray beam crosses the edge of the opening 54 so that the beam is never allowed to reach the position 71. The beam response control apparatus must be such that it will operate with equal effect and efficiency whether the light beam crosses the edge of the opening 54 perpendicularly or travels slowly, for example, from a position 74 to the position 75 across the boundary line 68 at a small angle so that the proportion of the light spot exposed within the area 54 increases slowly.

The manner in which this is accomplished will be apparent from the consideration of the action of the thyratron 17 and the associated circuits.

Between scanning intervals, after the machine has finished scanning the last bean, the timer drum 20 is in the position shown in Fig. 3. The brushes 28 and 29 rest upon the insulated base of the drum 20 and make contact with neither of the lugs 18 or 19. The positive terminal 30 of the power supply source is, therefore, disconnected from the thyratron plate 24. The plate potential bleeds rapidly down to ground potential through the resistors 26 and 27. The condenser 36 being small does not interfere with this action.

As the next bean enters the viewing chamber 4 and the drum 20 rotates to the position shown in Fig. 1, the brushes 28 and 29 make contact with the lugs 18 and 19 and the brushes 61 and 62 make contact with a different pair of lugs 18a and 19a. The brush 29 is now in contact with the lug 19 elevating the thyratron plate 24 to nearly 150-volts since the resistance of the resistor 23 is small in comparison with that of the resistors 26 and 27. Simultaneously the brush 28 has contact with the lug 18. The condenser 21 is thereby connected across the plate resistor 23. The voltage drop in the resistor 23 is relatively small, however, since no current is flowing in the thyratron 17.

The abrupt rise in potential of the thyratron plate 24 is transferred to the grid 25 of the cathode ray tube 13. The transfer takes place, however, through the capacitor voltage divider consisting of condensers 31, 32 and 33, so that the actual increase in potential of the grid 25 is reduced to a suitable value for turning on the cathode ray beam. Preferably, as already explained, the cathode ray tube 13 is provided with a cathode resistor 34. As shown, the cathode resistor 34, is connected directly in series with the cathode of the tube 13, neither being shunted. Consequently, as the grid 25 rises in potential sufficiently to turn on the cathode ray beam, the cathode potential of the cathode ray tube also rises to follow the grid thus effectively reducing the input signal. In this manner, different cathode ray tubes differing in the grid potential required for excitation of beams to desired intensity may be utilized in production apparatus and it is unnecessary to make any adjustments in the circuit when the cathode ray tube is replaced, nor is it necessary to make different adjustments of different machines in the production lines. This makes it unnecessary to employ skilled operators or repairmen and the apparatus may ordinarily be factory adjusted before installation.

When the scanning starts, the cathode ray spot such as the spot 66 shown in Fig. 4, flashes "on." It thereupon stays "on" until the scanning is terminated, when the timer 20 removes voltage, or until a cull is detected and recorded as a charge on the condenser 21.

If a bean being scanned is of such color or brightness as to cause the cathode ray spot to emerge from under the mask 14, such as the spot 75 for example, the sentinel phototube 15 "sees" the spot, sending a signal into the amplifier 16, which raises the grid potential of the thyratron 17, causing it to fire and causing the plate 24 to drop nearly to ground voltage. This sudden drop of potential suitably divided by the capacitor type voltage dividers 31, 32 and 33 is transferred to the grid 25 of the cathode ray tube 13. The cathode ray spot is thus completely extinguished. This action takes place very suddenly. When the thyratron 17 fires, the voltage drop across the anode resistor 23 charges the condenser 21. Since the resistor 22 has relatively little resistance, the charging takes place rapidly. As the cathode ray spot emerges, only about 25% of it shown is sufficient to trip the thyratron 17, which charges the condenser 21, and extinguishes the cathode ray spot before half of the spot has emerged, as shown by the spot position 75. There is no danger of extinguishing the spot accidently before the record is made on the capacitor 21, because it is the actual act of charging the capacitor which drives the extinction circuit.

The responses of the phototubes 8 and 11 may be automatically adjusted for uniform output in order to compensate for ageing of phototubes or variations in light intensity or of background brightness in the lamp housing 4 by means of a compensating circuit, not shown, similar to that shown in my Patent #2,228,560. Such compensators are not required, however, in the case of the sentinel amplifier 16 since the "dunker" or cathode ray extinction circuit described assures uniform response of the sentinel amplifier 16 and the thyratron 17 to emergence of the cathode ray light spot and to the exposed area 54 of the screen 53.

Although the grid 25 of the cathode ray tube 13 would eventually be returned to its average potential by the bleeding of the charges of the voltage dividing capacitors through the grid leak resistor 35, the time constant of the resistance capacitor circuit is so adjusted that the actual return of the cathode ray spot is always caused by the contacting of the brushes 28 and 29 with the lugs 18 and 19. The arrangement illustrated permits the cathode ray spot to be on an exposed portion of the screen within the area 54 no longer than is absolutely necessary to trip the thyratron 17. This time has been measured at approximately 0.0002 second.

If the bean traveling through the viewing chamber was not a cull so that the light spot never appeared within the exposed area 54, then the thyratron 17 was not tripped. The condenser 21 remains discharged and it has no effect upon the ejector 58 when the corresponding lugs 18 and 19 have traveled around to the position of the brushes 61 and 62. However, in the case of a cull, the condenser 21 has been charged and when it reaches the position of the condenser 21a shown in Fig. 1, the charge is released through the conductors 63 and the ejector 58 to cause operation of the tip 59 knocking the cull 57 into the cull chute 56.

While I have described my invention as embodied in concrete form and as operating in a specific manner in accordance with the provisions of the patent statutes, it should be understood that I do not limit my invention thereto, since various modifications thereof will suggest themselves to those skilled in the art without departing from the spirit of my invention, the scope of which is set forth in the annexed claims.

What I claim is:

1. A bichromatic article sorter comprising in combination a lamp-housing viewing chamber, a carriage for successively presenting articles to view in said chamber, color responsive light sensitive systems each responsive to different color of light reflected from the article in said viewing chamber, an indicating beam device having sweep circuits each responsive to one of said color selective light response systems for deflecting an indicating beam in transverse directions according to the response of said color selective light sensitive systems, a mask for said deflecting beam device having an exposed area, a sentinel photoelectric tube responsive to emergence of the beam into said exposed area from under the mask, a thyratron responsive to said sentinel phototube, said thyratron having an anode with an anode resistor in series therewith, a timer synchronized with said article carrier, an ejector, condensers in said timer, a voltage source, electrical connections between said source, said timer, said resistor and said thyratron for closing circuits therein in response to ignition of said thyratron for charging one of said condensers, and connections from said timer to said ejector for operating the ejector to remove an article from the carrier in response to presence of charge on one of said condensers, said deflecting beam device having a control electrode for turning on the beam in response to rise in voltage of the control electrode and for cutting off the beam in response to depression of the voltage, a coupling condenser connected between said thyratron anode and said control electrode, whereby the emergence of the beam into the exposed area of said mask illuminates said sentinel photoelectric tube, igniting said thyratron and charging one of said timer condensers, and the consequent current-times-resistance drop in said anode resistor accompanying the charging of said time condenser serves automatically to cut off the beam when an ejector operating charge has been placed upon the timer condenser.

2. A bichromatic article sorter comprising in combination a lamp-housing viewing chamber, a carriage for successively presenting articles to view in said chamber, color response light sensitive systems each responsive to different color of light reflected from the article in said viewing chamber, an indicating beam device having sweep circuits each responsive to one of said color selective light response systems for deflecting an indicating beam in transverse directions according to the responses of said color selective light sensitive systems, a mask for said deflecting beam device having an exposed area, a photoelectric tube responsive to emergence of the beam into said exposed area from under the mask, a current-controller adapted to be actuated responsive to said sentinel phototube, a timer synchronized with said article carrier, an ejector, condensers in said timer, electrical connections between said timer and said current controller for charging one of said condensers in response to actuation of said current-controller and including a circuit with a voltage-dropping resistor therein parallel to the condenser, producing a potential difference in said condenser and lowering the potential of said current-controller timer connection and connections from said timer to said ejector for operating the ejector to remove an article from the carrier to the cull chute in response to presence of charge on one of said condensers, said deflecting beam device having a control electrode for turning on the beam in response to rise in potential of the control electrode and for cutting off the beam in response to depression of the potential, a coupling condenser connected between said current-controller timer connection and said control electrode, whereby the emergence of the beam into the exposed area of said mask illuminates said sentinel photoelectric tube, actuates said current-controller, charging one of said timer condensers, and the consequent current-times-resistance drop in said anode resistor accompanying the charging of said timer-condenser serves automatically to cut off the beam after an ejector operating charge has been placed upon the timer condenser.

3. A sorter comprising in combination a lamp-housing viewing chamber, a carriage for successively presenting articles to view in said chamber, a selective light sensitive system responsive to character of light reflected from the article in said viewing chamber, an indicating beam device having a sweep circuit responsive to said selective light response system for deflecting an indicating beam according to the response of said light sensitive system, a mask for said deflecting beam device having an exposed area, a photoelectric tube responsive to emergence of the beam into said exposed area from under the mask, a thyratron responsive to said sentinel phototube, a timer synchronized with said article carrier, an ejector, condensers in said timer, a voltage source, electrical connections between said source, said timer and said thyratron for closing circuits therein in response to ignition of said thyratron for charging one of said condensers, said connections including a circuit with a voltage-dropping resistor therein parallel to the condenser, producing a potential difference therein and lowering the potential of said thyratron-timer connection, and connections from said timer to said ejector for operating the ejector to remove an article from the carrier in response to presence of charge on one of said condensers, said deflecting beam device having a control electrode for turning on the beam in response to rise in voltage of the control electrode and for cutting off the beam in response to depression of the voltage, a coupling condenser connected between said thyratron timer connection and said control electrode, whereby the emergence of the beam into the exposed area of said mask illuminates said sentinel photoelectric tube, and igniting said thyratron, charging one of said timer condensers, and the consequent current-times-resistance drop in said anode resistor accompanying the charging of said timer condenser serves automatically to cut off the beam after an ejector operating charge has been placed upon a timer condenser.

4. An article sorter comprising in combination a lamp-housing viewing chamber, a carriage for successively presenting articles to view in said chamber, a light sensitive system responsive to character of light reflected from the article in said viewing chamber, an indicating beam device responsive to said selective light response system, a photoelectric tube responsive to the beam of said indicating beam device, a thyratron responsive to said sentinel phototube, a timer synchronized with said article carrier, an ejector, a condenser in said timer, a voltage source, electrical connections between said source said timer and said thyratron for closing circuits therein in response to ignition of said thyratron for charging said condenser, said thyratron having an anode with an anode resistor in series therewith, producing a potential difference therein and lowering the potential of the thyratron-timer connection, and connections from said timer to said ejector for operating the ejector to remove an article from the carrier to the cull chute in response to presence of charge on said condenser, said indicating beam device having a control electrode for turning on the beam in response to rise in voltage of the control electrode and for cutting off the beam in response to depression of the voltage, a coupling condenser connected between said thyratron timer connection and said control electrode, whereby the emergence of the beam illuminates said sentinel photoelectric tube, igniting said thyratron and charging one of said timer condensers, and the consequent current-times-resistance drop in said anode resistor accompanying the charging of said timer condenser serves automatically to cut off the beam after an ejector operating charge has been placed upon the timer condenser.

5. An article sorter comprising in combination a lamp-housing viewing chamber, a carriage for successively presenting articles to view in said chamber, a selective light sensitive system responsive to character of light reflected from the article in said viewing chamber, a cathode ray tube having a sweep circuit responsive to said selective light response system for deflecting an indicating beam according to the response of said selective light sensitive system, a photoelectric tube responsive to predetermined beam deflection, a thyratron responsive to said sentinel phototube, a timer synchronized with said article carrier, an ejector, a condenser in said timer, electrical connections between said timer and said thyratron for charging said condenser in response to ignition of said thyratron, producing a potential difference in said condenser and lowering the potential of the thyratron-timer connection, and connections from said timer to said ejector for operating the ejector to remove an article from the carrier in response to presence of charge on said condenser, said cathode ray tube having a control electrode for turning on the beam in response to rise in voltage of the control electrode and for cutting off the beam in response to depression of the voltage, a coupling condenser connected timer between said thyratron connection and said control electrode, whereby deflection of the beam illuminates said sentinel photoelectric tube and consequent ignition of said thyratron serves automatically to cut off the beam after an ejector operating charge has been placed upon the timer condenser.

6. In a bichromatic sorting apparatus a cathode ray tube having a control electrode, a cathode and sweep circuits responsive to relative brightness of two different colors of light reflected from an object to be sorted, a control circuit for sorting articles in response to beam position in said cathode ray tube, said control circuit including a switching member for connecting it to a source of positive potential, a trip device responsive to cathode ray beam and a current-conducting element, the current in which is responsive to said trip device, and having a point the potential of which falls in response to variation of flow of current through said element, said control circuit having sufficient output to produce a current variation and potential drop in said current conducting element of the magnitude required for extinguishing the cathode ray beam when applied to said control electrode, a coupling condenser connected between said point and said control electrode, and a cathode resistor in series with said cathode for causing cathode potential to follow the control grid potential in response to striking of a cathode ray beam in said cathode ray tube, whereby the control electrode potential of the cathode ray tube is raised only sufficiently to turn on the beam when the control circuit is connected and lowered sufficiently to cut off the beam as soon as current has begun to flow.

7. In a bichromatic sorting apparatus a cathode ray tube having a control electrode and sweep circuits responsive to relative brightness of two different colors of light reflected from an object to be sorted, a control circuit for sorting articles in response to beam position in said cathode ray tube, said control circuit including a current-conducting element having a point the potential of which falls in response to cathode ray beam, said control circuit having sufficient output to produce a current variation and potential drop in said current conducting element of the magnitude required for extinguishing the cathode ray beam when applied to said control electrode, a coupling condenser connected between said point and said control electrode, whereby the control electrode potential of the cathode ray tube is raised to turn on the beam when the control circuit is connected and lowered sufficiently by appearance of the beam to cut off the beam.

8. In combination a cathode ray tube having a screen, a mask partially covering the screen, a sentinel phototube located to be responsive to emergence of the beam of the cathode ray tube from under the mask, a thyratron having an anode, a cathode and a control electrode, connections for raising the potential of the control electrode of the thyratron in response to illumination of the sentinel phototube, a current source having a positive terminal, a negative terminal and a grounded terminal, an anode resistor between said thyratron anode and said positive terminal, said cathode ray tube having a control electrode for turning the cathode ray beam on and off with rise and fall of potential of said control electrode, respectively, and having a cathode, a voltage divider between said ground terminal and said negative terminal, said thyratron cathode being connected to said grounded terminal, an electrostatic voltage divider coupling said thyratron anode to said cathode ray tube control electrode and a cathode resistor between said cathode ray tube cathode and an intermediate point in said resistance voltage divider, whereby flow of current in the cathode ray tube raises the potential of its cathode and causes cathode potential to follow the control electrode potential, the cathode ray tube is turned on when voltage is applied to the anode of the thyratron and turned off in response to emergence of a cathode ray spot from under the mask of the cathode ray screen, which causes the sentinel phototube to raise the potential of the thyratron control electrode and ignite the thyratron.

9. In combination a cathode ray tube having a screen, a mask partially covering the screen, a sentinel phototube located to be responsive to emergence of the beam of the cathode ray tube from under the mask, a thyratron having an anode a cathode and a control electrode, connections for raising the potential of the control electrode of the thyratron in response to illumination of the sentinel phototube, a current source having a positive terminal and a negative terminal, an anode resistor between said thyratron anode and said positive terminal, said cathode ray tube having a control electrode for turning the cathode ray beam on and off with rise and fall of potential of said control electrode respectively, said thyratron cathode having a connection to said negative terminal, and an electrostatic voltage divider coupling said thyratron anode to said cathode ray tube control electrode, whereby the cathode ray tube is turned on when voltage is applied to the anode of the thyratron and turned off in response to emergence of a cathode ray spot from under the mask of the cathode ray screen, which causes the sentinel phototube to raise the potential of the thyratron control electrode and ignite the thyratron.

10. A life-prolonging control circuit for a cathode ray tube having a cathode, a control electrode and other conventional electrodes for producing a cathode ray beam, said circuit comprising a thyratron having an anode, a cathode, and a control electrode, a current source having a positive terminal and a negative terminal, an anode resistor for the thyratron, an intermittently acting switch for connecting said anode resistor in series with said thyratron to said positive current source terminal, the thyratron cathode being connected to the said negative terminal, and a voltage reducing coupling circuit between said thyratron anode and said cathode ray tube control electrode for turning on the cathode ray beam when said intermittent switch is closed and for turning off the cathode ray beam when the control electrode of said thyratron is energized to cause current flow in said thyratron and depression of its anode potential.

11. Apparatus as in the preceding claim wherein the cathode ray tube is provided with a cathode resistor for causing the cathode potential to follow the control electrode potential for limiting the control electrode cathode potential to the value required to produce the requisite cathode ray beam intensity.

12. A life-prolonging control circuit for a cathode ray tube having a cathode, a control electrode and other conventional electrodes for producing a cathode ray beam, said circuit comprising a current source having a positive terminal, a variable-impedance current-controlling device normally having high impedance adapted to be connected to said current source, said current-controlling device being responsive to the beam of said cathode ray beam to fall in impedance, a resistor having a common terminal with said current-controlling device, a switch for connecting said resistor in series with said current-controlling device to said positive current source terminal, and a coupling condenser connected between said resistor common terminal and said cathode ray tube control electrode, whereby the cathode ray beam is turned on when said switch is closed and the cathode ray beam is turned off when the impedance of said current-controlling device is reduced in response to the beam to cause current flow in said resistor and voltage drop therein.

13. In an article sorter of the type in which electrical charges stored in condensers are employed for operating a cull ejector, a combination comprising a timer having a plurality of pairs of contact lugs between which condensers are connected, a cull responsive condenser charging and discharging circuit comprising a current source having a positive terminal with a brush to make contact intermittently with one of said lugs, a thyratron having an anode with a resistor between said brush and the thyratron anode, a second timer brush adapted to make contact with the other contact of a pair of contact lugs of the timer, a second anode resistor connected in series between said second brush and said thyratron anode, a sentinel phototube with connections for firing said thyratron when illuminated, an electrically energized optical system for illuminating said phototube in response to presence of a cull, said optical system having a control electrode for energizing the system in response to rise of the potential in the control electrode and de-energizing the system in response to fall in potential of the control electrode, a coupling condenser connected between said thyratron anode and said control electrode whereby the control electrode potential is caused to rise when the thyratron is connected to a current source by the timer for energizing the optical system and the control electrode potential is depressed by the voltage drop in an anode resistor whenever the thyratron is ignited by the optical system in response to a cull, and a cull ejector responsive to condenser charge.

14. In an article sorter of the type in which an electrical charge stored in a condenser is employed for operating a cull ejector, a combination comprising a timer with intermittently closing contacts, a condenser with first and second plates, a cull responsive condenser charging and discharging circuit comprising a current source having a positive terminal with a connection to one of the time contacts and the first condenser plate, a resistor having a first terminal connected to the other of said timer contacts, and a second terminal with a connection to said second condenser plate, a thyratron having a control element and an anode, the latter being connected to the second resistor terminal, a sentinel phototube adapted to ignite the thyratron, an electrically energized optical system for illuminating said phototube in response to presence of a cull, said optical system having a control electrode for energizing the system in response to rise of the potential in the control electrode and de-energizing the system in response to fall in potential of the control electrode, a coupling condenser connected between said thyratron anode and said control electrode whereby the control electrode potential is caused to rise when the resistor is connected to the current source by the timer for energizing the optical system and the control electrode potential is depressed and de-energizes the optical system whenever the thyratron is ignited by the optical system in response to a cull so as to charge the condenser, and a cull ejector responsive to condenser charge.

15. In an article sorter of the type in which electrical charge stored in a condenser is employed for operating a cull ejector, the combination comprising a timer with first and second contacts adapted to close intermittently, a condenser with first and second plates, a current source having a negative terminal and having a positive terminal with a connection to the first condenser plate, a current controlling device having a terminal connected to the first timer contact and a connection to the negative current source terminal, the second timer contact being connected to the second condenser plate, a sentinel phototube adapted to render said current controlling device conducting, said terminal rising in potential when said contacts are closed and falling in potential when said current-controlling device is rendered conducting to charge said condenser and produce a potential difference therein, an electrically energized optical system of the deflecting beam type for illuminating said tube in response to presence of a cull, said optical system having a control electrode for energizing the system in response to rise in control electrode potential and de-energizing the system in response to fall in control electrode potential, a coupling condenser connected between said current controlling device terminal and said control electrode, and a cull ejector responsive to condenser charge.

16. In combination a thyratron having a cathode, an anode and a control electrode, an anode resistor therefor adapted to be connected to a positive current source terminal, a voltage divider adapted to be connected between the thyratron cathode and a source of negative potential, a photoelectric tube having an output connection to the control electrode of the thyratron, a cathode ray tube having a screen with an exposed portion adjacent said photoelectric tube, a cathode with a cathode resistor connected to an intermittent point on said voltage divider and a control electrode with a coupling to the anode of said thyratron, whereby the application of positive potential to said thyratron anode raises the potential of the cathode ray control grid to turn its cathode ray beam on and the emergence of a cathode ray beam in the exposed area of its screen illuminates the photoelectric tube to raise the potential of the thyratron control electrode causing it to draw current through its anode resistor for depressing the potential of the thyratron anode and the cathode ray tube control grid to cut off the cathode ray beam.

17. In combination a thyratron, an anode resistor therefor adapted to be connected to a positive current source terminal, a photoelectric tube having an output connection to the control electrode of the thyratron, a cathode ray tube having a screen with an exposed portion adjacent said photoelectric tube, and a control electrode with a coupling to the anode of said thyratron, whereby the application of positive potential to said thyratron anode raises the potential of the cathode ray control grid to turn its cathode ray beam on and the emergence of a cathode ray beam in the exposed area of its screen illuminates the photoelectric tube to raise the potential of the thyratron control electrode causing it to draw current through its anode resistor for depressing the potential of the thyratron anode and the cathode ray tube control grid to cut off the cathode ray beam.

18. In combination a cathode ray tube having a screen, and a control electrode for controlling existence of a beam impinging on said screen, a current-conducting circuit, positive and negative terminals therefore adapted to be connected to a source of direct current, a first switch in said circuit toward the positive terminal, a second switching device in said circuit toward the negative terminal, a photoelectric tube adjacent said screen, said second switching device having a control element responsive to illumination of said photoelectric tube for closure of said second switching device, and a coupling between said circuit and said control electrode, whereby closure of said first switch raises control electrode potential to generate a cathode ray beam and illumination of the screen by said beam actuates said second switching device to lower control electrode potential and extinguish the beam.

19. In combination a cathode ray tube having a screen and a control electrode for controlling existence of a beam impinging on said screen, a photoelectric tube adjacent said screen, a potential depressing circuit including an impedance, a tripping device for causing passage of current through said impedance and voltage drop therein, a coupling condenser connected between said potential depressing circuit and said control electrode, said depressing circuit having an output of sufficient magnitude for extinguishing the beam when applied to said control electrode, and an operative connection from said photoelectric tube to said tripping device for actuating the latter in response to screen illumination, whereby continued impingement of said beam on said screen is prevented.

20. In combination a cathode ray tube having a screen and a control electrode for controlling existence of a beam impinging on said screen, a potential depressing circuit, a coupling from said potential depressing circuit to said control electrode, said depressing circuit having an output of sufficient magnitude for extinguishing the beam when applied to said control electrode, and a photoelectric device adjacent said screen operatively connected to said depressing circuit for actuating it in response to screen illumination and thereby preventing continued impingement of said beam on said screen.

21. In combination a cathode ray tube comprising a cathode and a control electrode, a control circuit for said tube coupled to said control electrode and adapted to apply positive or negative voltage impulses thereto to turn the tube on or off and a cathode resistor in series directly with said cathode, and being substantially free from shunting capacity, for causing the cathode potential to rise with control electrode potential and limit beam current of the tube.

22. In combination a cathode ray tube comprising a screen and electrodes for generating a beam impinging on the screen, including a control electrode adapted to be varied in potential and a cathode, and a resistor in series directly with said cathode, and being substantially free from shunting capacity, for causing cathode potential to rise with control electrode potential and limit intensity of the beam impinging on said screen.

23. In apparatus including a cathode ray tube comprising a screen, a cathode, and a control electrode, and using the tube in scanning cycles, the method of prolonging screen life, which comprises the steps of intermittently raising the control electrode potential to turn on a beam in the tube, raising the cathode potential toward control grid potential whenever the beam is turned on to limit intensity thereof, observing a predetermined portion of the screen for emergence of the cathode ray beam, and lowering the control grid potential whenever the cathode ray beam emerges into said predetermined portion of the screen.

24. In apparatus including a cathode ray tube comprising a screen and a control electrode, and using the tube in scanning cycles, the method of prolonging screen life, which comprises the steps of intermittently raising the control electrode potential to turn on a beam in the tube, observing a predetermined portion of the screen for emergence of the cathode ray beam, and lowering the control grid potential whenever the cathode ray beam emerges into said predetermined portion of the screen.

25. In combination a cathode ray tube having a screen, a voltage responsive control element for causing existence of a beam impinging on the screen when voltage is applied to said element, a photoelectric device responsive to illumination of said screen by impingement of a beam thereon, and a voltage extinction circuit responsive to said photoelectric device, connected to said control element for de-energizing it upon emergence of a beam on said screen.

26. A life-prolonging control circuit for a cathode ray tube having a cathode, a control electrode and other conventional electrodes for producing a cathode ray beam, said circuit comprising a thyratron having an anode, a cathode, and a control electrode, a current source having a positive terminal and a negative terminal, an anode resistor for the thyratron, an intermittently acting switch for connecting said anode resistor in series with said thyratron to said positive current source terminal, the thyratron cathode being connected to the said negative terminal, and a coupling circuit between said thyratron anode and said cathode ray tube control electrode for turning on the cathode ray beam when said intermittent switch is closed and for turning off the cathode ray beam when the control electrode of said thyratron is energized to cause current flow in said thyratron and depression of its anode potential.

DAVID C. COX.

REFERENCES CITED

The following references are of record in the file of this patent:

UNITED STATES PATENTS

| Number | Name | Date |
|---|---|---|
| Re. 20,506 | Soller | Sept. 14, 1937 |
| 2,098,384 | Goodrich | Nov. 9, 1937 |
| 2,152,821 | Schlesinger | Apr. 4, 1939 |
| 2,188,679 | Dovaston et al. | Jan. 30, 1940 |
| 2,222,943 | George | Nov. 26, 1940 |
| 2,241,256 | Gould | May 6, 1941 |
| 2,244,826 | Cox | June 10, 1941 |
| 2,255,484 | Dome | Sept. 9, 1941 |
| 2,261,645 | Delvaux | Nov. 4, 1941 |
| 2,301,522 | Cawein | Nov. 10, 1942 |
| 2,350,069 | Schrader et al. | May 30, 1944 |
| 2,366,357 | Schlesinger | Jan. 2, 1945 |
| 2,371,897 | Knick | Mar. 20, 1945 |
| 2,402,096 | Somers | June 11, 1946 |
| 2,415,191 | Rajchman | Feb. 4, 1947 |
| 2,415,870 | De Ryder | Feb. 18, 1947 |
| 2,453,711 | Isbister et al. | Nov. 16, 1948 |